*O. B. Judd,*
*Reciprocating Saw Mill,*
№ 7,684. Patented Oct. 1, 1850.
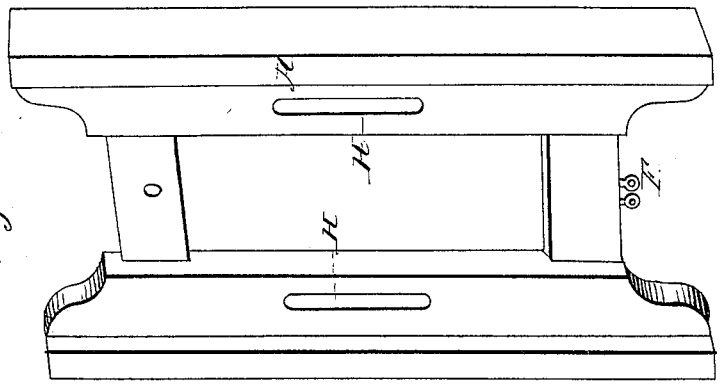
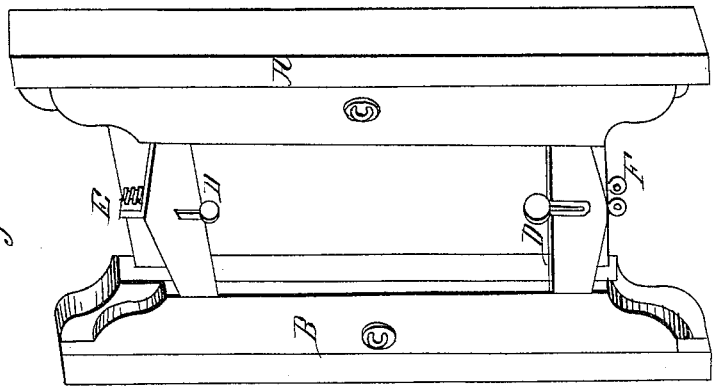

UNITED STATES PATENT OFFICE.

O. B. JUDD, OF ROCKTON, NEW YORK.

SAW-GATE.

Specification of Letters Patent No. 7,684, dated October 1, 1850.

*To all whom it may concern:*

Be it known that I, OLIVER B. JUDD, of Rockton, in the county of Herkimer and State of New York, have invented a new and useful Improvement in the Saw-Gate of a Sawmill; and I do hereby declare that the following is a full, clear, and exact description of the construction and operation of the same, reference being had to the annexed drawings, making a part of this specification, in which—

No. 1 is a perspective view of the whole, No. 2 is a perspective view of the common saw gate, and No. 3 is a perspective view of the pinion, shaft, &c.

The improvement consists in raising and lowering the saw, at the pleasure of the operator, and the object is to use the whole length of the cutting part of the saw in sawing small logs.

To construct the same, I make a saw gate B, of the same size and dimensions of the original or common saw gate A in which I hang the saw in the common way of hanging saws in saw mills; I make slots H in the common saw gate A, and with the bolts C, I bolt the gate B firmly to the front side of the gate A, and by loosening the nuts on the bolts C they pass in the slots H, allowing the gate B to be raised and lowered, to present any part of the cutting edge of the saw to cut the log, and when so placed and secured either up or down, the nuts are screwed tight to hold it firm until that part of the saw becomes dull, when it is raised or lowered, and again made fast, bringing the remainder of the teeth of the saw into action; thus the edge of the saw is kept straight by use, instead of jointing and filing the useless teeth every time the saw is sharpened, thereby enabling the saw to cut twice the amount of lumber, with the same amount of filing.

D, D, are the stirrups in which the saw is hung.

F, F, represents the stirrups which attach the pitman to the common saw gate A.

E is the rack and G the pinion by which the gate B is raised and lowered, by applying a wrench to the square part on the right hand end of the shaft (as shown in No. 3) this square is on the back side of the gate A, the nuts to the bolts C are likewise on the back side of the same, and are turned by the same wrench that turns the pinion.

What I claim as my invention and desire to secure by Letters Patent is—

Raising and lowering the saw, for the purpose of using the whole cutting part of the same.

OLIVER B. JUDD.

Witnesses:
HENRY D. SAFFORD,
JOHN G. BARRY.